(12) United States Patent
Tanaka et al.

(10) Patent No.: US 8,223,611 B2
(45) Date of Patent: Jul. 17, 2012

(54) NEAR-FIELD LIGHT GENERATING ELEMENT AND METHOD FOR FORMING THE ELEMENT

(75) Inventors: Kosuke Tanaka, Tokyo (JP); Seiichi Takayama, Tokyo (JP); Satoshi Tomikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 894 days.

(21) Appl. No.: 12/328,232

(22) Filed: Dec. 4, 2008

(65) Prior Publication Data

US 2010/0142079 A1 Jun. 10, 2010

(51) Int. Cl.
  *G11B 7/00* (2006.01)
  *G11B 7/135* (2012.01)
(52) U.S. Cl. ......... 369/112.01; 369/112.05; 369/112.08; 369/112.09; 369/112.23; 369/112.27
(58) Field of Classification Search .................. None
  See application file for complete search history.

(56) References Cited

U.S. PATENT DOCUMENTS

| | | | |
|---|---|---|---|
| 5,949,572 A | 9/1999 | Kouta | |
| 6,649,894 B2 | 11/2003 | Matsumoto et al. | |
| 6,768,556 B1 | 7/2004 | Matsumoto et al. | |
| 7,032,427 B2 * | 4/2006 | Niwa et al. | 72/325 |
| 7,936,531 B2 * | 5/2011 | Tomikawa et al. | 360/59 |
| 2006/0280103 A1 | 12/2006 | Tawa | |
| 2010/0073802 A1 * | 3/2010 | Komura et al. | 360/59 |

FOREIGN PATENT DOCUMENTS

| | | |
|---|---|---|
| JP | 07-110415 | 4/1995 |
| JP | 07-312425 | 11/1995 |
| JP | 2000-155207 | 6/2000 |
| JP | 2007-154244 | 6/2007 |

* cited by examiner

*Primary Examiner* — Duy Deo
(74) *Attorney, Agent, or Firm* — Frommer Lawrence & Haug LLP

(57) ABSTRACT

Provided is a method for forming a near-field light generating element, which is capable of sufficiently suppressing the unevenness of a waveguide surface and the distortion within the waveguide. The forming method comprises the steps of: forming a first etching stopper layer on a lower waveguide layer; forming a second etching stopper layer; forming, on the second etching stopper layer, a plasmon antenna material layer; performing etching with the second etching stopper layer used as a stopper, to form a first side surface of plasmon antenna; forming a side-surface protecting mask so as to cover the first side surface; and performing etching with the first and second etching stopper layers used as stoppers, to form the second side surface. By providing the first and second etching stopper layer, over-etching can be prevented even when each etching process takes enough etch time, which allows easy management of etching endpoints.

10 Claims, 10 Drawing Sheets

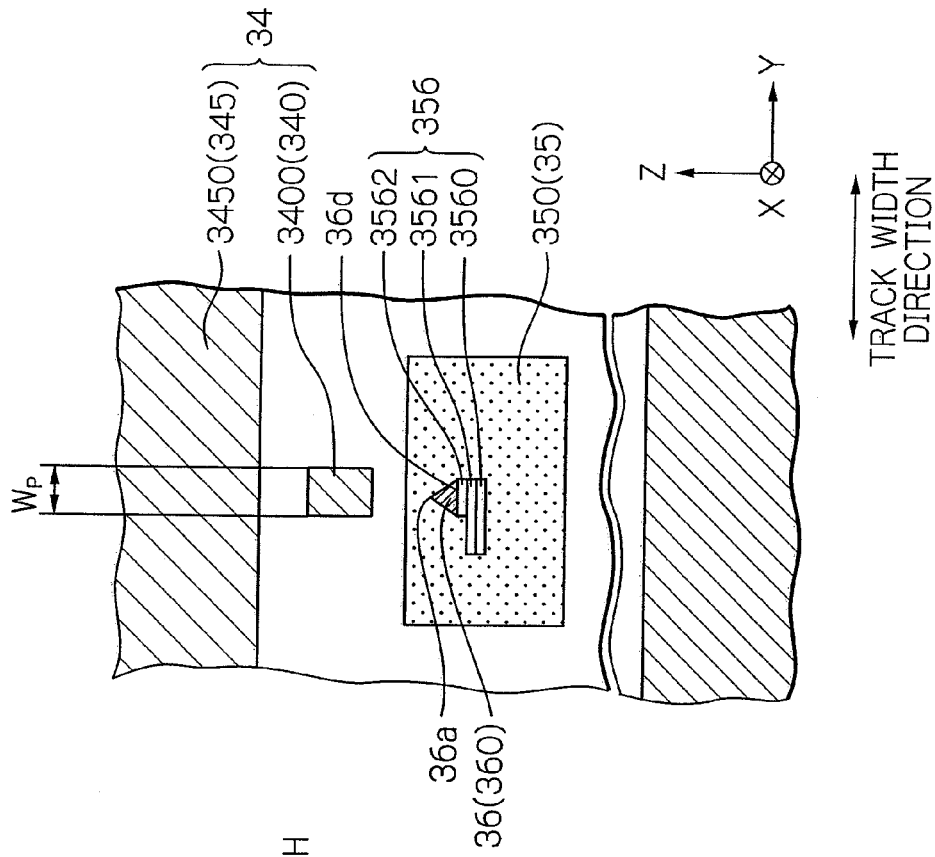
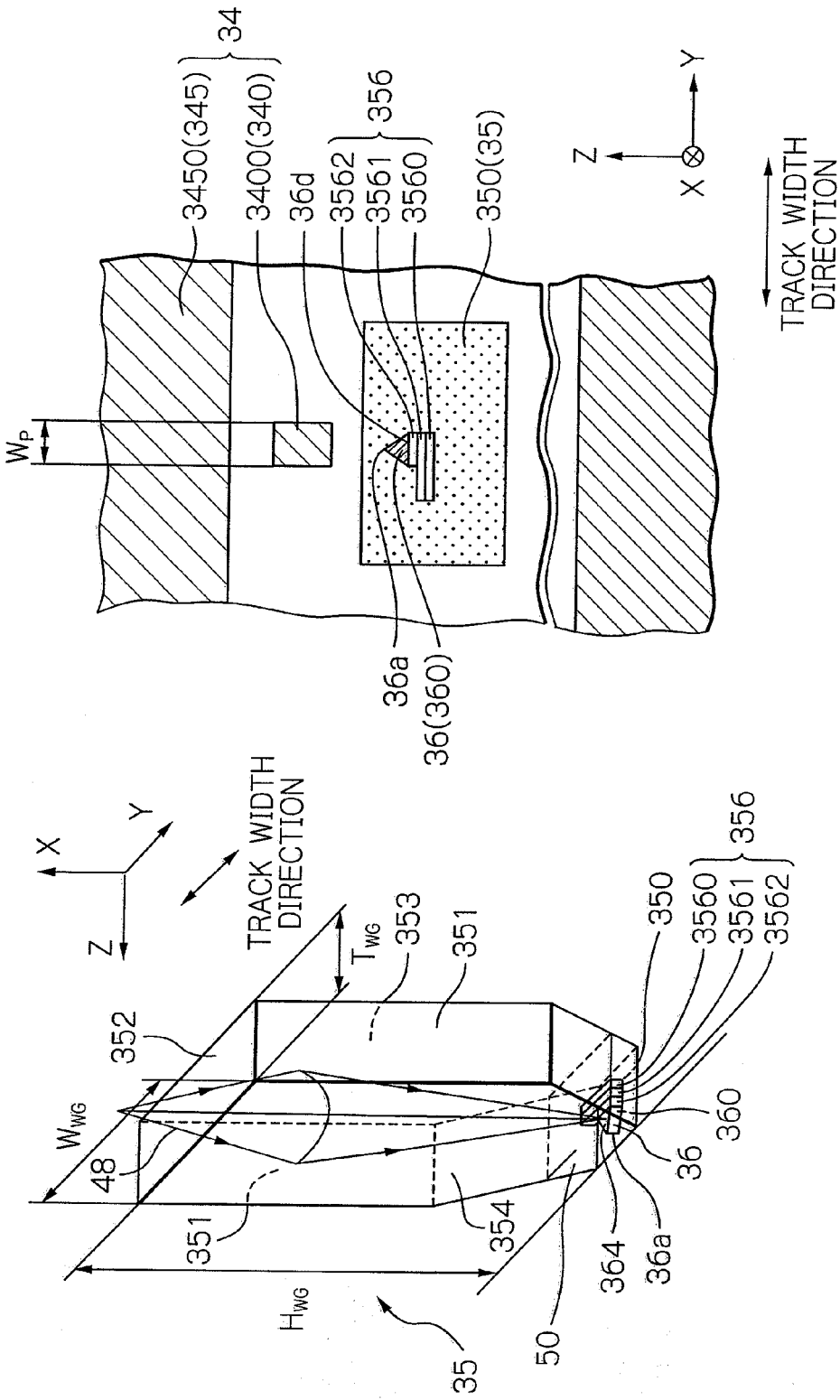
Fig. 3a
Fig. 3b

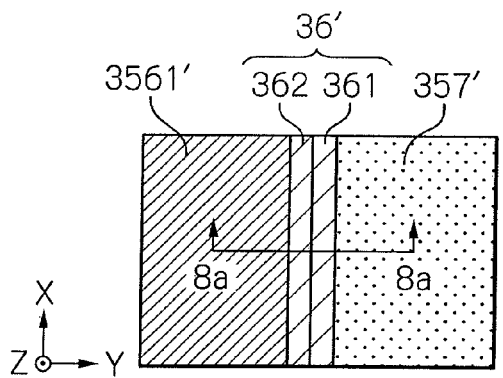
Fig. 8a1
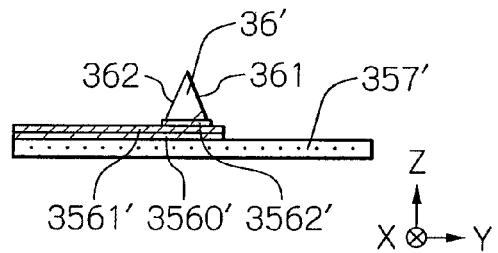
Fig. 8a2
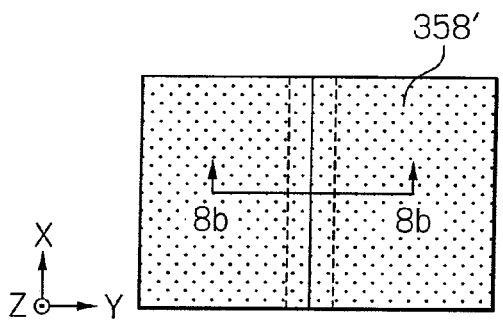
Fig. 8b1
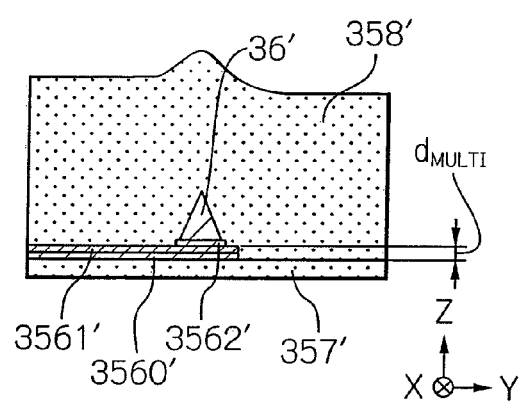
Fig. 8b2
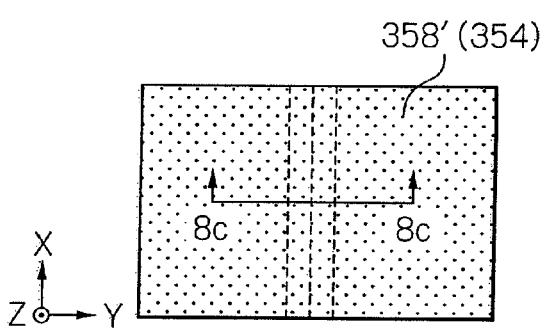
Fig. 8c1
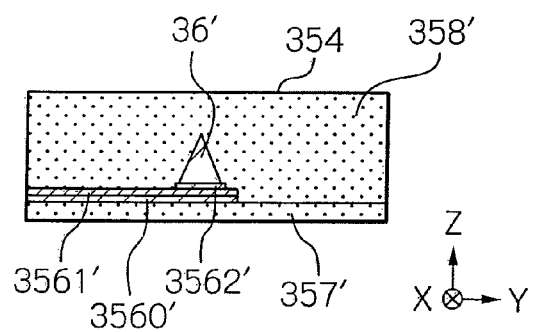
Fig. 8c2

NEAR-FIELD LIGHT GENERATING ELEMENT AND METHOD FOR FORMING THE ELEMENT

BACKGROUND OF THE INVENTION

1. Field of the Invention

The present invention relates to a method for forming a near-field light generating element that generates near-field light by receiving light. Further, the present invention relates to a thermally-assisted magnetic recording head provided with the near-field light generating element, for writing data by thermally-assisted magnetic recording technique.

2. Description of the Related Art

As the recording density of a magnetic recording apparatus, such as a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem whether the recorded information is stably held for a long time or not under fear of the degradation of thermal stability of magnetization due to decrease in volume.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic pole material of which the magnetic core of the head is formed. Therefore, the head cannot write data to the magnetic recording medium when the anisotropic magnetic field (coercive force) of the medium exceeds the write field limit.

Recently, as a method for solving this problem of thermal stability, so-called a thermally-assisted magnetic recording technique is proposed, in which writing is performed by reducing the anisotropic magnetic field with heat supplied to the magnetic recording medium formed of a magnetic material with a large $K_U$ just before the application of write field. For the thermally-assisted magnetic recording technique, a method has been intensively developed, in which a near-field light generating element that includes a minute metal piece, so-called a plasmon antenna, is used for generating near-field light, and the magnetic recording medium is irradiated with the near-field light. For example, U.S. Pat. No. 6,768,556 B1 discloses a near-field light generating element that includes a metal scatterer with a strobilus shape formed on a substrate and a dielectric material film formed around the metal scatterer. And U.S. Pat. No. 6,649,894 B2 discloses a near-field light generating element made of a flat scatterer formed on the surface of a substrate.

However, a difficult problem may arise as described below in achieving thermally-assisted magnetic recording by using the above-described near-field light generating element.

In forming a near-field light generating element, an etching process is generally used for forming a plasmon antenna on a substrate. However, the etching process usually causes a substantially large step (depth difference) between the plasmon antenna and its surrounding. The amount of the step may reach, for example, several hundred nm (nanometers). After the etching process, the step and the plasmon antenna are covered with a dielectric material that is to form a waveguide, and the step may cause the formed waveguide to have an uneven surface or to have distortion within it. Whereas, in order to generate the sufficient amount of near-field light in the plasmon antenna, it is required to reduce the loss of light propagating through the waveguide as far as possible to properly irradiate the plasmon antenna with the light. Therefore, the uneven surface of the waveguide and the distortion within the waveguide has to be suppressed as far as possible. Moreover, when other head element part, for example, a main magnetic pole layer of a write head element is further formed over the waveguide, the unevenness and distortion of the layer also have to be avoided as far as possible in order to obtain desired characteristics. For this reason, the unevenness of the surface of the waveguide as an undercoat has to be suppressed.

SUMMARY OF THE INVENTION

Accordingly, it is an object of the present invention to provide a method for forming a near-field light generating element, which is capable of sufficiently suppressing the unevenness of a waveguide surface and the distortion within the waveguide, and to provide a near-field light generating element in which unevenness of a waveguide surface and distortion within the waveguide is sufficiently suppressed to reduce a light propagation loss. Another object of the present invention is to provide a near-field light generating element in which light propagating through a waveguide can be properly irradiated on a plasmon antenna. A further object of the present invention is to provide a thermally-assisted magnetic recording head provided with the near-field light generating element, to provide a head gimbal assembly (HGA) provided with the head, and further to provide a magnetic recording apparatus provided with the HGA.

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. In a certain layer or element, a portion on the substrate side is defined as a "lower portion", and a portion on the opposite side as an "upper portion". Further, in embodiments of the head according to the present invention, "X-, Y- and Z-axis directions" are indicated in some figures as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

According to the present invention, a method for forming a near-field light generating element is provided, the element including a plasmon antenna that has a first side surface and a second side surface, both surfaces being inclined to a substrate surface, and generates near-field light by being irradiated with light. The method comprising the steps of:

forming a first etching stopper layer on a lower waveguide layer that is formed on/above the substrate surface and is made of material for forming a waveguide, and then forming a second etching stopper layer;

forming, on the second etching stopper layer, a plasmon antenna material layer that is made of material for forming the plasmon antenna;

etching the plasmon antenna material layer with the second etching stopper layer used as a stopper, to form the first side surface;

forming a side-surface protecting mask so as to cover the formed first side surface; and etching the plasmon antenna material layer in which the first side surface is covered with the side-surface protecting mask, with the first and second etching stopper layers used as stoppers, to form the second side surface, thereby forming the plasmon-antenna.

In the method for forming the near-field light generating element, by providing the first and second etching stopper layers, over-etching can be prevented even when each etching process takes enough etch time, which allows easy management of etching endpoints. As a result, a large step (depth difference) does not be formed. Thereafter, an upper waveguide layer is further stacked, and there can be sufficiently suppressed the unevenness of a surface, particularly of an upper surface, of the formed waveguide. Further, the distortion within the waveguide is sufficiently suppressed, which can reduce the propagation loss of the laser light propagating through the waveguide. Moreover, in other head element part, for example, a main magnetic pole layer of a write head element, which is formed over the waveguide, there can be avoided the unevenness and the distortion caused by using the waveguide as an undercoat.

In the forming method of the near-field light generating element, it is preferable that a side-surface forming mask is formed on the plasmon antenna material layer, and then, an etching with the side-surface forming mask used as a mask is applied, to form the first side surface. Further, it is preferable that an additional etching stopper layer is further formed between the first etching stopper layer and the second etching stopper layer. And in this embodiment of providing the additional etching stopper layer, it is also preferable that, after the formation of the plasmon antenna material layer and further the first side surface, an etching is applied with the additional etching stopper layer used as a stopper, to remove portions of the second etching stopper layer, the portions positioned other than directly below the plasmon antenna material layer, and thereafter, the side-surface protecting mask is formed.

Further in the embodiment of providing the additional etching stopper layer, it is preferable that, after the formation of the second side surface, an etching is applied to expose potions of the additional etching stopper layer, the portions positioned other than directly below the plasmon-antenna material layer. Furthermore, it is preferable that the forming method further comprises: forming an upper waveguide layer made of material for forming the waveguide, so as to cover the plasmon antenna material layer on which the first side surface and the second side surface are formed; planarizing an upper surface of the formed upper waveguide layer, with use of polishing; and forming a height regulating mask having a predetermined width in a height direction, on the upper surface of the planarized upper waveguide layer, and forming, with use of etching, the plasmon antenna having a predetermined height and portions of the waveguide covering the plasmon antenna. Here, the step (depth difference), which existed before being covered with the upper waveguide layer, has been suppressed to be small, and can be easily eliminated or reduced by the planarization. As a result, there can be sufficiently suppressed the unevenness of the formed waveguide surface and the distortion within the waveguide, which can reduce the propagation loss of the laser light.

Moreover, in other head element part, for example, a main magnetic pole layer of a write head element, which is formed over the waveguide, there can be avoided the unevenness and the distortion caused by using the waveguide as an undercoat.

Further, it is preferable that a refractive index of the lower waveguide layer and the upper waveguide layer is set to a value between each of refractive index values of the first etching stopper layer and the second etching stopper layer, and a refractive index value of the additional etching stopper layer. Further, in this case, it is more preferable that an overall refractive index of a multilayer that comprises the first etching stopper layer, the additional etching stopper layer and the second etching stopper layer, is set to a value substantially equal to the refractive index of the lower waveguide layer and the upper waveguide layer. Furthermore, it is also preferable that each of the refractive indexes of the first etching stopper layer and the second etching stopper layer is set to be larger than the refractive index of the lower waveguide layer and the upper waveguide layer, and the refractive index of the additional etching stopper layer is set to be smaller than the refractive index of the lower waveguide layer and the upper waveguide layer. The setting of these refractive indexes enables the plasmon antenna to effectively be irradiated with the light propagating through the waveguide.

Further, in the above-described method for forming a near-field light generating element, it is also preferable that the first etching stopper layer and the second etching stopper layer are formed of tantalum oxide, the additional etching stopper layer is formed of alumina, the plasmon antenna material layer is formed of one element selected from a group of Au, Ag, Al, Cu, Pd, Pt, Rh and Ir, or an alloy composed of at least two elements selected from the group, and the lower waveguide layer and the upper waveguide layer are formed of silicon oxy-nitride, and further each of the etching for forming the first side surface and the second side surface is an ion milling with use of mixed gas of nitrogen and argon, nitrogen gas, or gas including nitrogen. This setting enables each etching during forming processes to be performed appropriately due to the achievement of the above-described setting of refractive indexes.

According to the present invention, a method for manufacturing a thermally-assisted magnetic recording head is further provided, the head comprises: a write head element for writing data onto a magnetic recording medium, formed on/above an element-formation surface of a substrate; a plasmon antenna for generating near-field light, having at least two side surfaces inclined to the element-formation surface; and a waveguide for guiding light to the plasmon antenna, wherein a near-field light generating element, which comprises the plasmon antenna and portions of the waveguide, the portions covering the plasmon antenna, is formed by the above-described method for forming a near-field light generating element.

According to the present invention, a near-field light generating element is further provided, which comprises: a plasmon antenna for generating near-field light by being irradiated with light, having a first side surface and a second side surface, both side surfaces being inclined to a substrate surface; a lower waveguide layer formed on/above the substrate surface and made of material for forming a waveguide; a stopper multilayer comprising a first etching stopper layer, an additional etching stopper layer and a second etching stopper layer, these layers being sequentially stacked, and formed in a position at least directly below the plasmon antenna; and an upper waveguide layer constituting, together with the lower waveguide layer, a portion of the waveguide covering the plasmon antenna, a refractive index of the lower waveguide layer and the upper waveguide layer being set to a value between each of refractive index values of the first etching stopper layer and the second etching stopper layer, and a refractive index value of the additional etching stopper layer.

In the above-described near-field light generating element, by employing the above-described configuration of the stopper multilayer and the plasmon antenna, there can be sufficiently suppressed the unevenness of the surface, particularly of the upper surface, of the waveguide and the distortion within the waveguide, which can reduce the propagation loss of the light propagating through the waveguide. Moreover, it is possible to effectively direct the propagating light to the plasmon antenna in the waveguide. Furthermore, in other head element part, for example, a main magnetic pole layer of a write head element, which is formed over the waveguide, there can be avoided the unevenness and the distortion caused by using the waveguide as an undercoat.

In the near-field light generating element according to the present invention, an overall refractive index of the stopper multilayer is preferably set to a value substantially equal to the refractive index of the lower waveguide layer and the upper waveguide layer. Further, it is also preferable that each of the refractive indexes of the first etching stopper layer and the second etching stopper layer is set to be larger than the refractive index of the lower waveguide layer and the upper waveguide layer, and the refractive index of the additional etching stopper layer is set to be smaller than the refractive index of the lower waveguide layer and the upper waveguide layer.

Further, in the near-field light generating element according to the present invention, it is preferable that the first etching stopper layer and the second etching stopper layer are formed of tantalum oxide, the additional etching stopper layer is formed of alumina, the plasmon antenna material layer is formed of one element selected from a group of Au, Ag, Al, Cu, Pd, Pt, Rh and Ir, or an alloy composed of at least two elements selected from the group, and the lower waveguide layer and the upper waveguide layer are formed of silicon oxy-nitride.

According to the present invention, a thermally-assisted magnetic recording head is further provided, which comprises: a write head element for writing data onto a magnetic recording medium, formed on/above an element-formation surface of a substrate; a plasmon antenna for generating near-field light, having at least two side surfaces inclined to the element-formation surface; and a waveguide for guiding light to the plasmon antenna. Here, the plasmon antenna and portions of the waveguide covering the plasmon antenna constitutes a near-field light generating element, and the near-field light generating element has the above-described structure. Further, according to the present invention, a head gimbal assembly (HGA) is provided, which comprises a suspension and the above-described thermally-assisted magnetic recording head fixed on the suspension. According to the present invention, a magnetic recording apparatus is further provided, which comprises: the above-described HGA, at least one magnetic recording medium, and a control circuit for controlling a light emission operation for the light propagating through the waveguide, and for controlling a write operation performed by the thermally-assisted magnetic recording head onto the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 3a shows a perspective view illustrating one embodiment of waveguide and near-field light generating element (plasmon antenna);

FIG. 3b shows a plan view illustrating the shapes, on the head part end surface, of the ends of electromagnetic transducer, waveguide and near-field light generating element (plasmon antenna);

FIGS. 8a1 to 8f show schematic diagrams illustrating the latter half processes in one embodiment of the method for forming the near-field light generating element according to the present invention.

DESCRIPTION OF THE PREFERRED EMBODIMENTS

Figure 1:
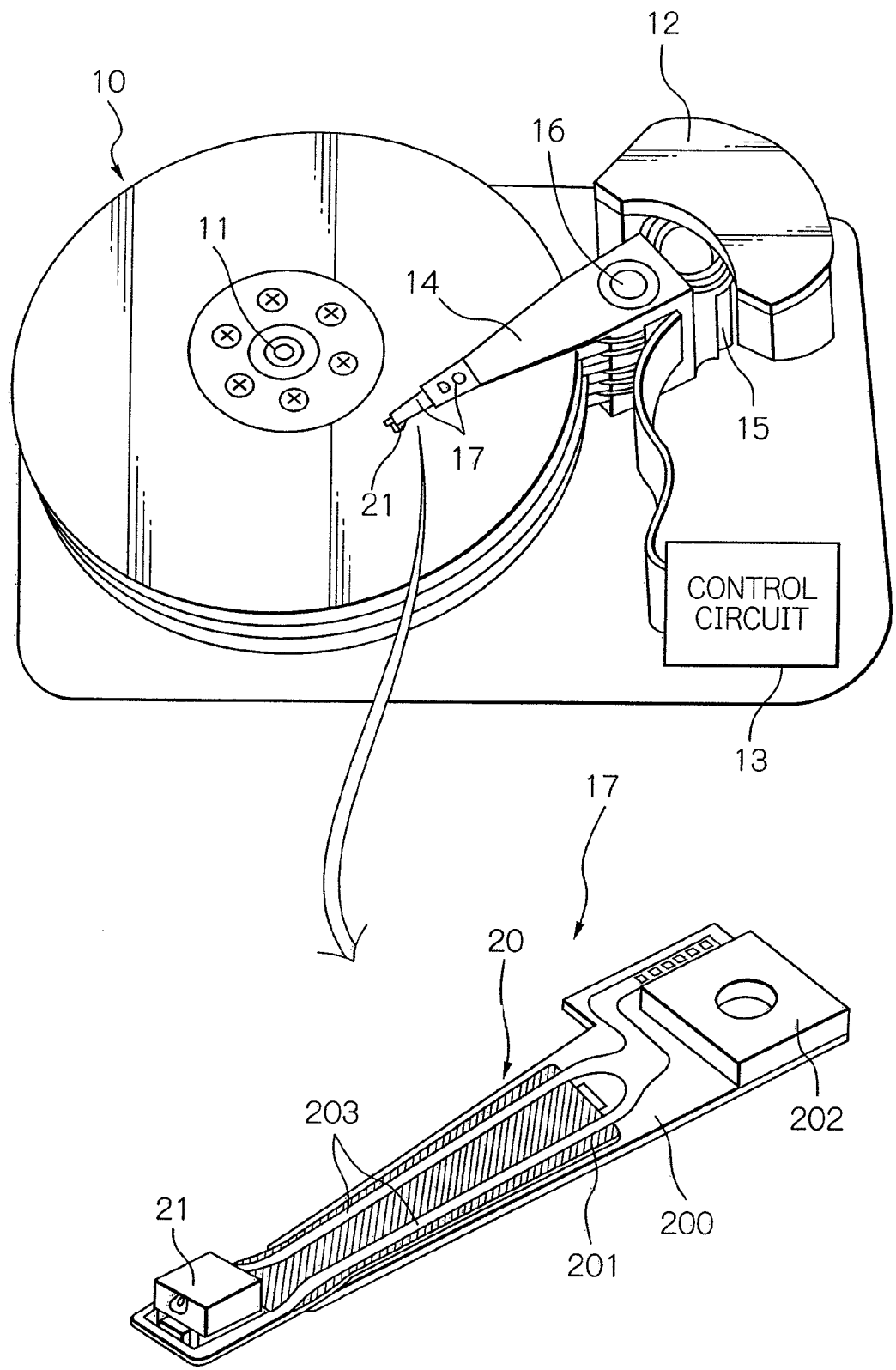
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thin-film magnetic head 21 as a thermally-assisted magnetic recording head; and a recording/reproducing and light-emission control circuit 13 for controlling write/read operations of the thin-film magnetic head 21 and further for controlling the emission operation of a laser diode as a light source that generates laser light for thermally-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the thin-film magnetic head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and slider 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thin-film magnetic head 21 is fixed to the flexure 201 at the top end portion of the suspension 20 so as to face the surface of each magnetic disk 10 with a predetermined space (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
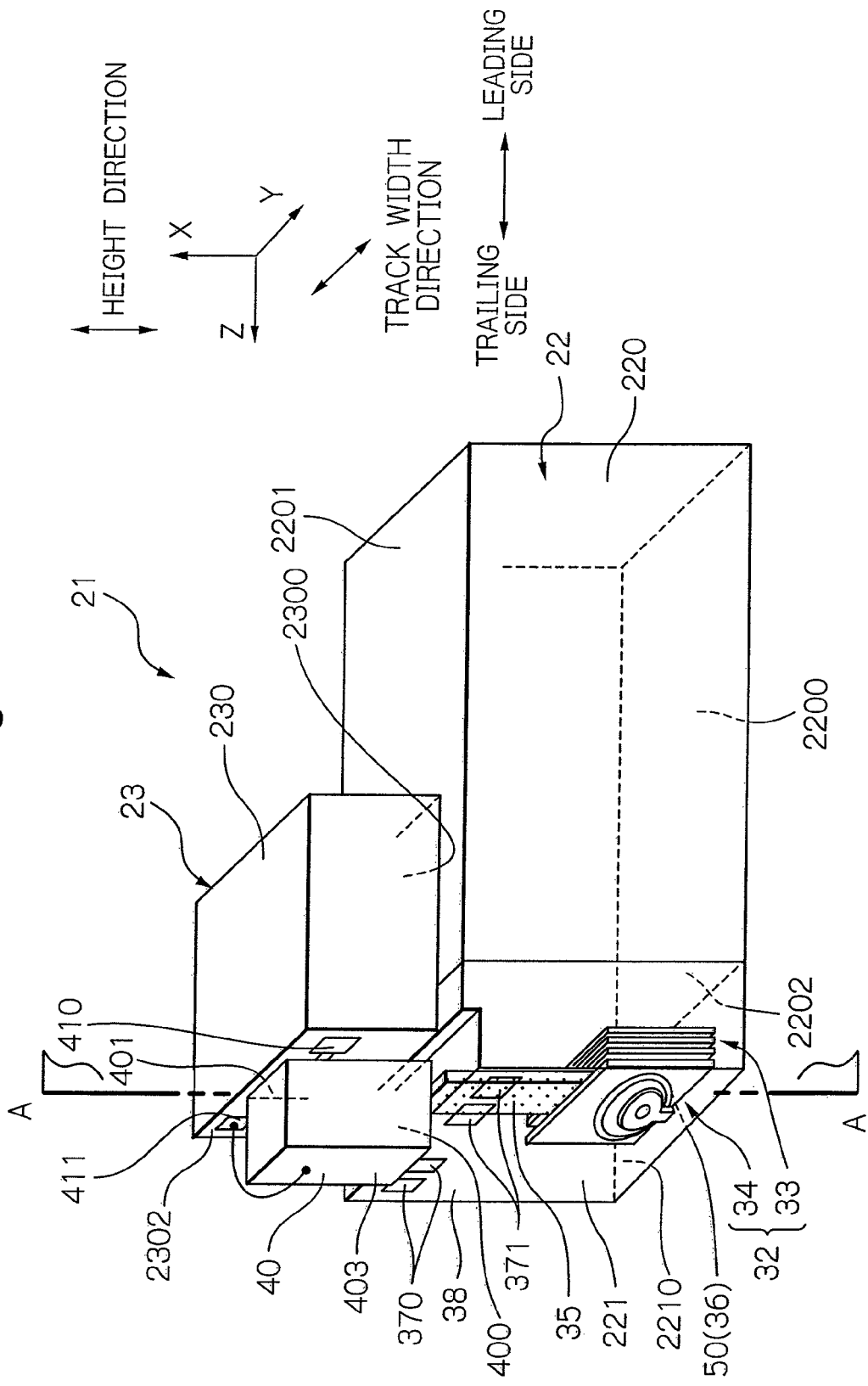
FIG. 2 shows a perspective view illustrating one embodiment of thin-film magnetic head according to the present invention.

FIG. 2 shows a perspective view illustrating one embodiment of thin-film magnetic head 21 according to the present invention.

As shown in FIG. 2, a thin-film magnetic head 21 as a thermally-assisted magnetic recording head is constituted of a slider 22 and a light source unit 23. The slider 22 includes: a slider substrate 220 having an air bearing surface (ABS) 2200 processed so as to provide an appropriate flying height, and formed of, for example, AlTiC ($Al_2O_3$—TiC); and a head part 221 formed on an element-formation surface 2202 perpendicular to the ABS 2200. While, the light source unit 23 includes: a unit substrate 230 having an joining surface 2300, and formed of, for example, AlTiC ($Al_2O_3$—TiC); and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface of the slider substrate 220 which is opposite to the ABS 2200.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a plasmon antenna 36 for generating near-field light, in which one end surface is a portion of the opposed-to-medium surface of the head; and a waveguide 35 for guiding laser light generated from a laser diode 40 as a light source provided in the light source unit 23 to the plasmon antenna 36. The plasmon antenna 36 and a portion of the waveguide 35 covering the plasmon antenna 36 constitute a near-field light generating element 50, as described later. The head part 221 further includes: an overcoat layer 38 formed on the element-formation surface 2202, so as to cover the MR element 33, the electromagnetic transducer 34 and the near-field light generating element 50; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the near-field light generating element 50 (the plasmon antenna 36) reach the head part end surface 2210 of the head part 221, which is opposed to the medium surface. Here, the head part end surface 2210 and the ABS 2200 constitute the whole opposed-to-medium surface of the thin-film magnetic head 21. During actual write and read operations, the thin-film magnetic head 21 aerodynamically flies above the surface of the rotating magnetic disk with a predetermined flying height. Thus, the ends of the MR element 33 and electromagnetic transducer 34 face the surface of the magnetic record layer of the magnetic disk with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the waveguide 35, is irradiated onto the plasmon antenna 36. The irradiation causes near-field light to be generated from the plasmon antenna 36. The generated near-field light reaches the magnetic recording layer of the magnetic disk, and heats a portion of the magnetic record layer. As a result, the anisotropic magnetic field (coercive force) of the portion is decreased to a value that enables writing; thus the thermally-assisted magnetic recording can be achieved.

In the present embodiment, the waveguide 35 and the near-field light generating element 50 (the plasmon antenna 36) are provided between the MR element 33 and the electromagnetic transducer 34, that is, on the leading side (−Z direction) of the electromagnetic transducer 34. Thus, the portion of the magnetic recording layer that is heated by being irradiated with the near-field light from the plasmon antenna 36 receives a write magnetic field immediately. Thereby, a favorable write operation can be carried out. The locations of the waveguide 35 and the near-field light generating element 50 (the plasmon antenna 36) is not limited to the above-described locations; the near-field light generating element 50 (the plasmon antenna 36) may have only to be provided adjacent to the end on the head part end surface 2210 side of the electromagnetic transducer 34. Further, the thin-film magnetic head 21 may have a configuration in which the laser diode 40 is directly mounted on the slider 22 without using the light source unit 23.

Also according to FIG. 2, the light source unit 23 includes: the unit substrate 230; the laser diode 40 provided on the source-installation surface 2302 of the unit substrate 23; the terminal electrode 410 electrically connected to the lower surface 401 as an electrode of the laser diode 40; and the terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40.

As explained above, the thermally-assisted magnetic recording head 21 has a structure in which the slider 22 and the light source unit 23 are joined to each other. In the joining, the joining surface 2300 of the unit substrate 230 is made having a surface contact with the back surface 2201. Then, the locations of the unit substrate 230 and the slider substrate 220 are determined so that the laser light generated from the laser diode 40 can be directly entered to the end surface 352 (FIG. 4) opposite to the ABS 2200 of the waveguide 35. Each of the slider 22 and light source unit 23 may have an arbitrary size. For example, the slider 22 may be so-called a femto slider in which the width in the track width direction (Y-axis direction) is 700 µm; the length in Z-axis direction is 850 µm; and the thickness in X-axis direction is 230 µm. In the case, the light source unit 23 may be one size smaller than the slider 22, for example, in which the width in the track width direction is 425 µm; the length is 300 µm; and the thickness is 300 µm.

FIG. 3a shows a perspective view illustrating one embodiment of waveguide 35 and near-field light generating element 50 (plasmon antenna 36). Further, FIG. 3b shows a plan view illustrating the shapes, on the head part end surface 2210, of the ends of electromagnetic transducer 34, waveguide 35 and near-field light generating element 50 (plasmon antenna 36).

The waveguide 35 is positioned, in the present embodiment, parallel to the element-formation surface 2202 and between the MR element 33 and the electromagnetic transducer 34 as described above. And the waveguide 35 extends from its end surface 350 on the head part end surface 2210 to the opposite end surface 352 on the head part end surface 2211, as shown in FIG. 3a. The waveguide 35 may have a rectangular parallelepiped shape, or may have a portion on the head part end surface 2210 side, which tapers in the track width direction (Y-axis direction), as shown in FIG. 3a. The width $W_{WG}$ in the track width direction (Y-axis direction) of the waveguide 35 may be, for example, in the range approximately from 1 to 200 µm (micrometers), and the thickness $T_{WG}$ (in Z-axis direction) may be, for example, in the range approximately from 2 to 10 µm, and the height (length) $H_{WG}$ (in X-axis direction) may be, for example, in the range approximately from 10 to 300 µm.

Further, both the side surfaces 351, the lower surface 353 and the upper surface 354 of the waveguide 35 have a contact with the overcoat layer 38 (FIG. 2). The waveguide 35 is formed of a dielectric material with refractive index $n_0$ higher than that of the constituent material of the overcoat layer 38, made by using, for example, a sputtering method. For example, in the case that the overcoat layer 38 is formed of $SiO_2$ (n=approximately 1.5), the waveguide 35 can be formed of, for example, $SiO_xN_Y$ (silicon oxy-nitride) (n=approximately 1.8). This material structure of the waveguide 35 not only enables the propagation loss of laser light to be reduced due to the excellent optical characteristics of the constituent material, but also provides the total reflection in both the side surfaces 351, the lower surface 353 and the upper surface 354 due to the existence of the overcoat layer 38 as a clad. As a result, more amount of laser light can reach the plasmon antenna 36, which improves the efficiency of generating near-field light.

The near-field light generating element 50 includes a plasmon antenna 36, and a portion of the waveguide 35 covering the plasmon antenna 36. As shown in FIGS. 3a and 3b, an end surface of the near-field light generating element 50, which is a part of the head part end surface 2210, includes an end surface 350 of the waveguide 35, and an end surface 360 of the plasmon antenna 36. The portion of the waveguide 35 within the near-field light generating element 50 includes a stopper multilayer 356 in which sequentially stacked is a first etching stopper layer 3560, an additional etching stopper layer 3561 and a second etching stopper layer 3562. On the second etching stopper layer 3562, there is provided the plasmon antenna 36. That is, the stopper multilayer 356 is provided at least in the position directly below the plasmon antenna 36.

The plasmon antenna 36 is, as shown also in FIGS. 3a and 3b, disposed in the end surface 350 side of the waveguide 35, and is a conductive member formed of, for example, metal in which the end surface 360 reaches the head part end surface 2210. The end surface 360 of the plasmon antenna 36 has, in the present embodiment, a triangular shape with a vertex 36a on the trailing side (+Z direction) and a bottom edge 36d on the leading side (−Z direction). When a light-receiving end surface 364 of the plasmon antenna 36 is irradiated with laser light 48, the plasmon antenna 36 generates near-field light with sufficient intensity on the end surface 360, particularly, near the vertex 36a. In this case, by employing the above-described configuration of the stopper multilayer 356 and the plasmon antenna 36, there can be, as will be explained later in detail, sufficiently suppressed the unevenness of a surface of the waveguide 35, particularly of the upper surface 354, and the distortion within the waveguide 35, to thereby reduce the propagation loss of the laser light 48. Moreover, it is possible to effectively direct the laser light 48 to the plasmon antenna 36 in the waveguide 35. Furthermore, other head element part that is formed over the waveguide 35, for example, a main magnetic pole layer 340 of an electromagnetic transducer 34 which will be explained later, can avoid having unevenness or distortion caused by using the waveguide as an undercoat. A detailed description will be given later of the structure and action of the near-field light generating element 50 including the plasmon antenna 36, with reference to FIG. 5.

Referring to FIG. 3b, the vertex 36a of the plasmon antenna 36 is disposed near the edge on the leading side of the main magnetic pole layer 340 of the electromagnetic transducer 34, which will be explained later, so as to be opposed to the edge. Here, the end surface 3400 of the main magnetic pole layer 340, which is a part of the head part end surface 2210, has a shape of a rectangle or a trapezoid. In such a configuration on the head part end surface 2210, when the plasmon antenna 36 is irradiated with the laser light 48, near-field light enough to heat the magnetic recording layer of a magnetic disk is generated mainly near the vertex 36a. That is, the vicinity of the vertex 36a serves as a heat-assisting portion for effecting the heat-assisting action to heat a portion of the magnetic recording layer of a magnetic disk. Thus, the vertex 36a, which is a center of the heat-assisting portion, is positioned very close to the main magnetic pole layer 340 functioning as a writing portion. Therefore, write field with sufficient intensity can be applied to a sufficiently heated portion of the magnetic recording layer of a magnetic disk, the portion having a sufficiently lowered anisotropic magnetic field due to the heating. This allows achieving stable thermally-assisted write operation.

Figure 4:
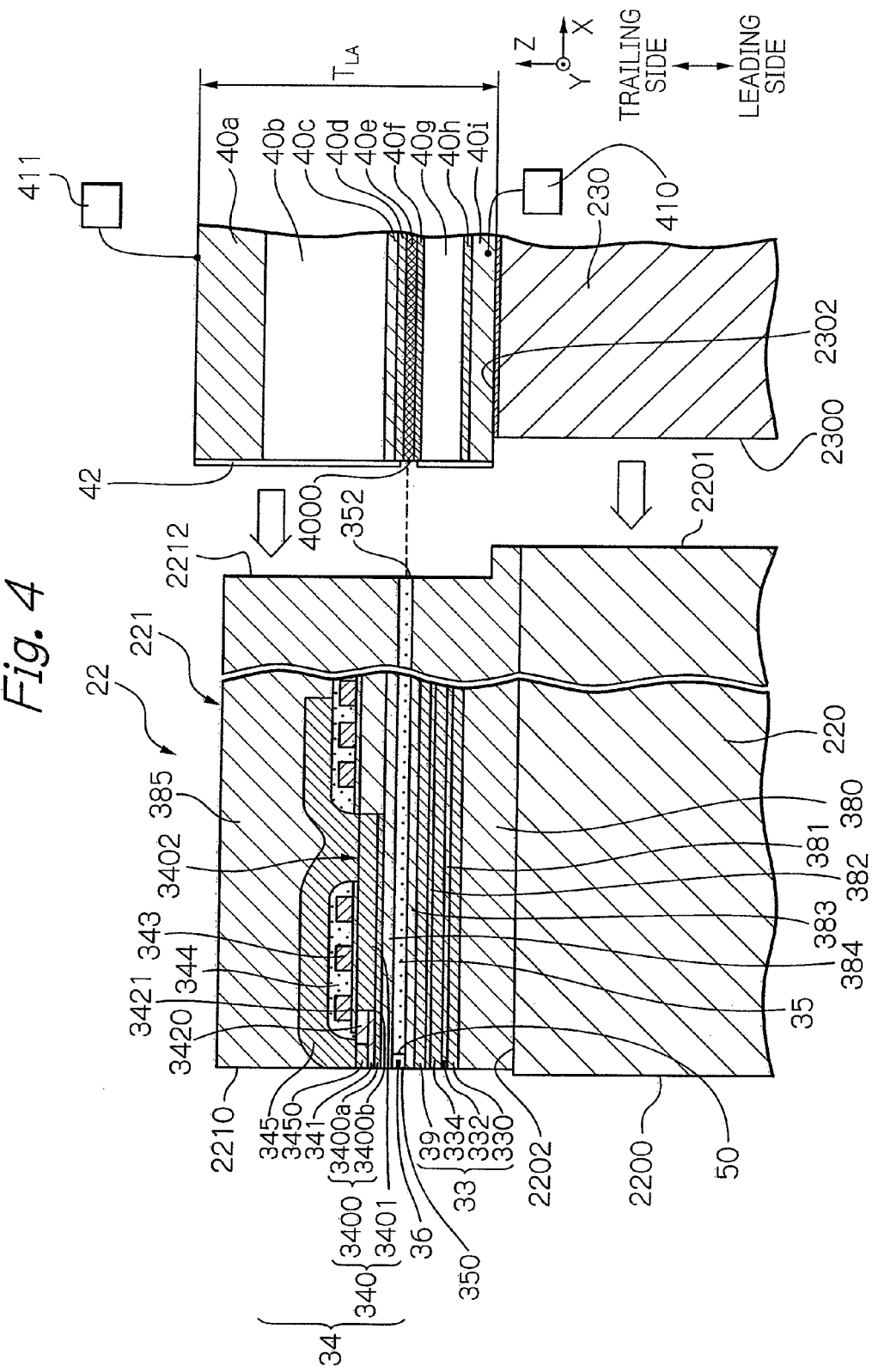
FIG. 4 shows a cross-sectional view taken by plane A in FIG. 2, schematically illustrating a main part of the thin-film magnetic head.

FIG. 4 shows a cross-sectional view taken by plane A in FIG. 2, schematically illustrating a main part of the thin-film magnetic head 21.

As shown in FIG. 4, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 µm.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 4, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic record layer (perpendicular magnetization layer) of the magnetic disk 10, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head part end surface 2210, and includes: a main pole front end 3400a extending to the head part end surface 2210, with a small width $W_P$ (FIG. 3b) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density. As shown in FIG. 3b, the main magnetic pole 340 has a rectangular or trapezoidal shape on the head part end surface 2210. The above-described width $W_P$ is the length of the edge on the leading side of the shape, which determines the width of track formed on the magnetic recording layer of the magnetic disk. The width $W_P$ is, for example, in the range of approximately 0.05 to 0.5 µm.

Backing to FIG. 4, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.1 to 0.8 µm. The gap layer 341 forms a gap provided for separating the main magnetic pole layer 340 from the write shield layer 345 in the region near the head part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 µm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 4, and may be, for example, in the range from two to seven.

The write shield layer 345 reaches the head part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. The trailing shield 3450 is, in the present embodiment, planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Further, in the present embodiment, an inter-element shield layer 39 is provided between the MR element 33 and the electromagnetic transducer 34, sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 4, the laser diode 40 has, in the present embodiment, a multilayered structure in which sequentially stacked is: an n-electrode 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode 40i. In the present embodiment, the p-electrode 40i is bonded with the source-installation surface 2302 of the unit substrate 230. On the front and rear cleaved surfaces of the multilayered structure of the laser diode 40, respectively formed are reflective layers made of, for example, $SiO_2$ or $Al_2O_3$ for exciting the oscillation by total reflection. Further, the reflective layer 42 has an opening in the position of the active layer 40e including the light-emission center 4000.

The wavelength $\lambda_L$ of the emitted laser light may be, for example, in the range of approximately 400 to 650 nm. The laser light may have a liner polarization (TM polarization) in which the vibration of electric field component of the laser light is in Z-axis direction. The laser diode 40 has, for example, a thickness $T_{LA}$ of approximately 60 to 200 μm. Further, an electric source provided within the magnetic disk drive apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 connected electrically to the p-electrode 40i and the terminal electrode 411 connected electrically to the n-electrode 40a by using the electric source, to oscillate the laser diode 40. Then, laser light radiates from the opening including the emission center 4000 of the reflective layer 42.

The laser diode 40 and terminal electrodes 410 and 411 are not limited to the above-described embodiment. For example, the n-electrode 40a may be bonded with the source-installation surface 2302 of the unit substrate 230, by turning the electrodes of the laser diode 40 upside down. Further, the laser diode 40 may have another structure using other semiconducting materials such as GaAlAs system. Or the same structure as a diode usually used for optical disk storages may be adopted for the laser diode 40. Further alternatively, the thin-film magnetic head 21 may includes no laser diodes; then, the light-emission center of a laser diode provided within the magnetic disk apparatus and the end surface 352 of the waveguide 35 may be connected by using optical fiber.

Figure 5:
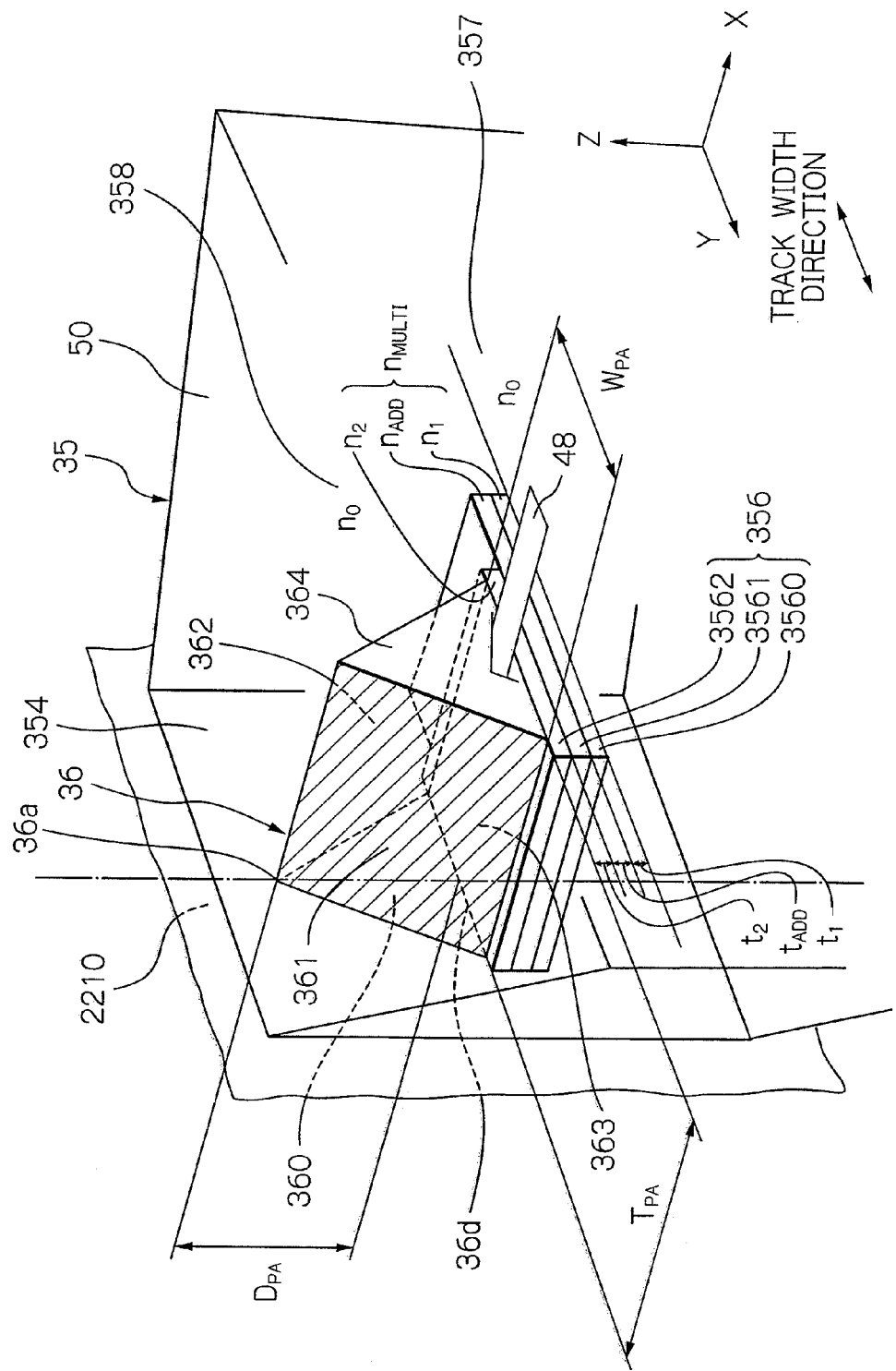
FIG. 5 shows a perspective view illustrating the structure of one embodiment of the near-field light generating element (plasmon antenna) according to the present invention.

FIG. 5 shows a perspective view illustrating the structure of one embodiment of the near-field light generating element 50 (plasmon antenna 36) according to the present invention.

Referring to FIG. 5, the near-field light generating element 50 includes the plasmon antenna 36, and a portion of the waveguide 35 covering the plasmon antenna 36. The portion of the waveguide 35 includes: a lower waveguide layer 357 made of material that is used for forming the waveguide 35; a stopper multilayer 356 formed on the lower waveguide layer 357; and an upper waveguide layer 358 formed, on the lower waveguide layer 357, so as to cover the stopper multilayer 356 and the plasmon antenna 36, made of material that is used for forming the waveguide 35. The stopper multilayer 356 has a structure in which sequentially stacked on the lower waveguide layer 357 is: a first etching stopper layer 3560, an additional etching stopper layer 3561, and a second etching stopper layer 3562. The plasmon antenna 36 is provided on the stopper multilayer 356. That is, the stopper multilayer 356 is positioned at least directly below the plasmon antenna 36. The waveguide 35 and the plasmon antenna 36 reach the head part end surface 2210, and respective end surface 350 and end surface 360 constitute a part of the head part end surface 2210.

The plasmon antenna 36 has: the above-described end surface 360; a light-receiving end surface 364 positioned on the opposite side to the end surface 360; a bottom surface 363 having a surface contact with the upper surface of the second etching stopper layer 3562; and a first side surface 361 and a second side surface 362 that have a triangular-roof shape, both inclining relative to the element-formation surface 2202 (FIG. 4). Here, the end surface 360 has a triangle shape with a vertex 36a on the trailing side (+Z direction) and the bottom edge 36d on the leading side (−Z direction). When the light-receiving end surface 364 of the plasmon antenna 36 is irradiated with laser light 48, the electric field of the laser light 48 causes free electrons within the plasmon antenna 36 to be forcibly and uniformly oscillated, which resultantly excites plasmon in the plasmon antenna 36. On the end surface 360 of the plasmon antenna 36, the plasmon propagating inside the plasmon antenna 36 converges on the vertex 36a that is an arrival point of the end portion tapered toward +Z direction due to the existence of the first and second side surfaces 361 and 362. As a result, on the end surface 360, near-field light with the highest intensity is generated in the vicinity of the vertex 36a. It is preferable that the end surface 360 has a shape of an isosceles triangle so that the generated near-field light is distributed symmetrically with respect to a centerline in the direction along track.

The plasmon antenna 36 is preferably formed of conductive material, for example, a metal such as Au, Ag, Al, Cu, Pd, Pt, Rh or Ir, or an alloy composed of at least two elements out of these elements. It is preferable that the distance $D_{PA}$ (in Z-axis direction) between the vertex 36a and the bottom edge 36d on the end surface 360 is sufficiently smaller than the wavelength of the incident laser light 48, and is set to, for example, 20 to 400 nm. It is preferable that the width $W_{PA}$ of the bottom edge 36d is also sufficiently smaller than the wavelength of the incident laser light 48, and is set to, for example, 20 to 400 nm. Further, the thickness $T_{PA}$ (in X-axis direction) of the plasmon antenna 36 is preferably set to, for example, 30 to 500 nm.

Referring also to FIG. 5, each refractive index of the lower waveguide layer 357 and the upper waveguide layer 358 is set to a value between the refractive index values of the first and second etching stopper layers 3560 and 3562 and the refractive index value of the additional etching stopper layer 3561. That is, the refractive index of each of the lower waveguide layer 357 and the upper waveguide layer 358, which is the same as that of portions of the waveguide 35 except the near-field light generating element 50, is designated by $n_O$, the refractive index of the first etching stopper layer 3560 by $n_1$, the refractive index of the additional etching stopper layer 3561 by $n_{ADD}$, and the refractive index of the second etching stopper layer 3562 by $n_2$, then these refractive indexes are set to meet either of the following expressions:

$$n_{ADD} \leq n_0 \leq (n_1, n_2); \text{ or} \quad (1)$$

$$(n_1, n_2) = n_0 = n_{ADD}. \quad (2)$$

In the present embodiment, the expression (1) is satisfied. That is, the refractive indexes are set such that each of the refractive index $n_1$ of the layer 3560 and the refractive index $n_2$ of the layer 3562 is equal to or more than the refractive index $n_0$ of the lower and upper waveguide layers 357 and 358, and the refractive index $n_{ADD}$ of the layer 3561 is smaller than the refractive index $n_0$ of the layers 357 and 358.

As a material configuration to satisfy the expression (1), for example, it is possible that the first etching stopper layer 3560 and the second etching stopper layer 3562 are formed of TaO$_X$ (tantalum oxide) ($n_1=n_2$=approximately 2.1), the additional etching stopper layer 3561 is formed of Al$_2$O$_3$ (alumina) ($n_{ADD}$=approximately 1.6), and the lower waveguide layer 357 and the upper waveguide layer 358 are formed of SiO$_X$N$_Y$ (silicon oxy-nitride) ($n_0$=approximately 1.8). The employment of such material configuration can effectively direct the laser light 48 to the light-receiving end surface 364 of the plasmon antenna 36 within the waveguide 35, as will be explained later in detail with reference to FIG. 6.

Moreover, by employing the above-described material configuration, as will be explained later in detail, in forming processes of the plasmon antenna 36, the first side surface 361 and the second side surface 362 can be formed desirably by using the first etching stopper layer 3560, the additional etching stopper layer 3561 and the second etching stopper layer 3562 as etching stoppers. This can sufficiently suppress the unevenness of the surface, particularly of the upper surface 354, of the waveguide 35 and the distortion within the waveguide 35, and thus can reduce the propagation loss of the laser light 48.

Here, the thickness $t_1$ of the first etching stopper layer 3560 is, for example, approximately 1 to 5 nm, the thickness $t_{ADD}$ of the additional etching stopper layer 3561 is, for example, approximately 5 to 10 nm, and the thickness $t_2$ of the second etching stopper layer 3562 is, for example, approximately 1 to 5 nm.

Figure 6A:
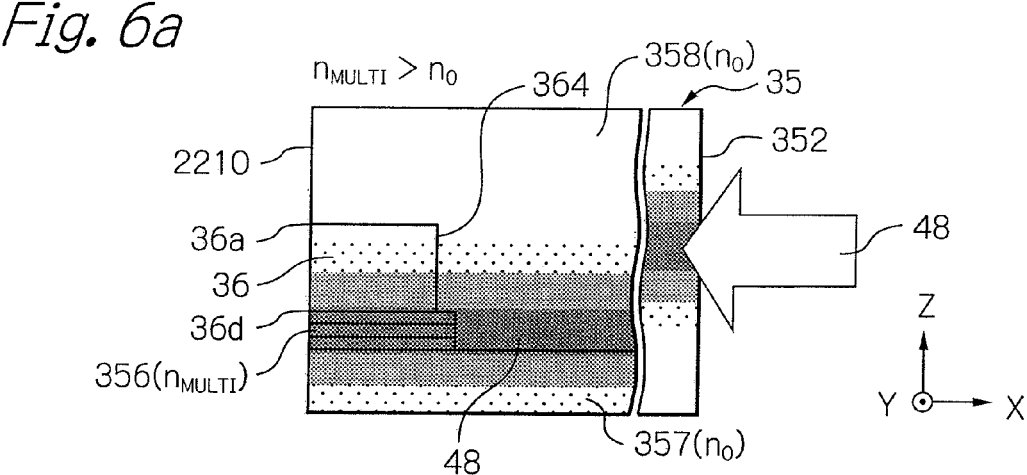
FIGS. 6a to 6c show schematic diagrams for explaining effects of providing the stopper multilayer in the near-field light generating element.
Figure 6B:
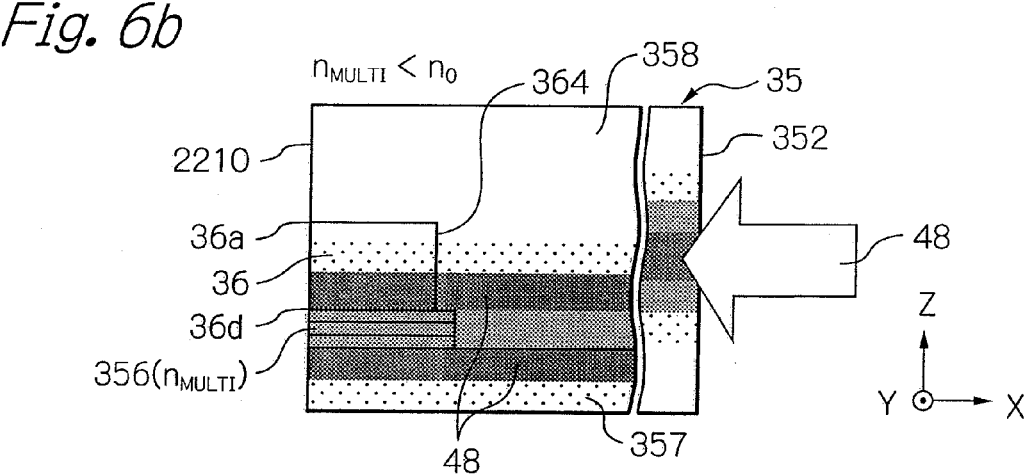
Figure 6C:
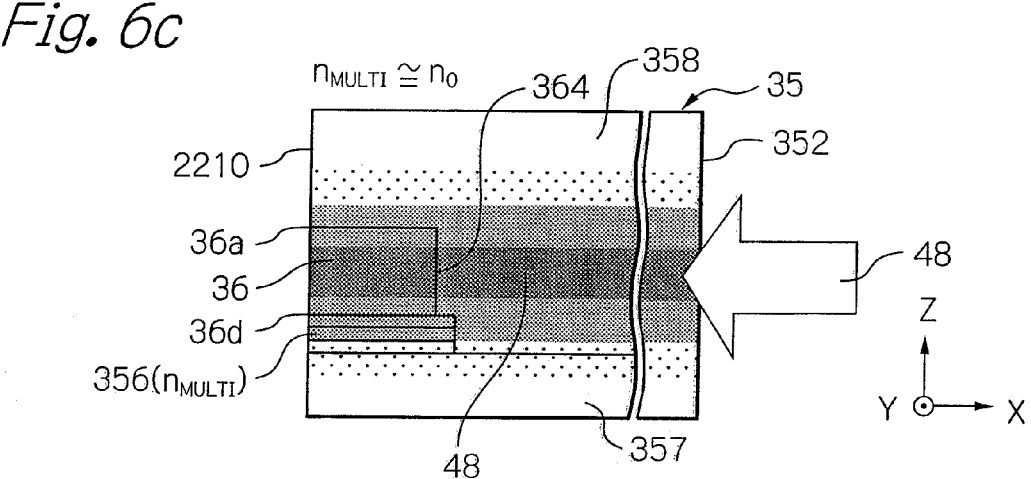

FIGS. 6a to 6c show schematic diagrams for explaining effects of providing the stopper multilayer 356 in the near-field light generating element 50. The figures correspond to cross-sectional views of the near-field light generating element 50, taken by surface A shown in FIG. 2.

Here, an overall refractive index $n_{MULTI}$ (FIG. 5) of the stopper multilayer 356 will be explained. In the stopper multilayer 356, respective layer thicknesses $t_1$, $t_{ADD}$ and $t_2$ (FIG. 5) of the first etching stopper layer 3560, the additional etching stopper layer 3561 and the second etching stopper layer 3562, which are constituent layers, are set to be sufficiently smaller than the wavelength $\lambda_L$ (for example, approximately 400 to 650 nm) of the laser light 48. Therefore, the overall refractive index $n_{MULTI}$ of the stopper multilayer 356 can be calculated by an arithmetic average of the refractive indexes of respective layers taking into account weights of the layer thicknesses. That is, $$n_{MULTI} = (t_1 \times n_1 + t_{ADD} \times n_{ADD} + t_2 \times n_2)/(t_1 + t_{ADD} + t_2). \quad (3)$$

Accordingly, by adopting a combination of refractive indexes $n_1$, $n_{ADD}$ and $n_2$ that satisfy the expression (1) or (2), and setting respective suitable layer thicknesses, the overall refractive index $n_{MULTI}$ of the stopper multilayer 356 can have a value close to the refractive index no of the lower and upper waveguide layers 357 and 358.

Let it be considered, for example, such a case that the first etching stopper layer 3560 and the second etching stopper layer 3562 are formed of TaO$_X$ (tantalum oxide) ($n_1=n_2$=approximately 2.1) with a thickness of $t_1=t_2$=2.5 nm, the additional etching stopper layer 3561 is formed of Al$_2$O$_3$ (alumina) ($n_{ADD}$=approximately 1.6) with a thickness of $t_{ADD}$=7 nm, and the lower waveguide layer 357 and the upper waveguide layer 358 are formed of SiO$_X$N$_Y$ (silicon oxy-nitride) ($n_0$=approximately 1.8).

In this case, the total thickness of the stopper multilayer 356 is $t_1+t_{ADD}+t_2$=12 nm, and the overall refractive index $n_{MULTI}$ of the stopper multilayer 356 is approximately 1.81 from equation (3). This value is substantially equal to the refractive index $n_0$ of the lower waveguide layer 357 and the upper waveguide layer 358. Thus, the refractive index $n_{MULTI}$ can be adjusted so as to set to a value substantially equal to the refractive index $n_0$ of the waveguide 35. The action and effects derived from the above-described setting will be explained below.

First, an explanation will be given of a case in which the refractive index $n_{MULTI}$ is larger than the refractive index $n_0$. Referring to FIG. 6a, in the case of $n_{MULTI} > n_0$, the incident laser light 48 is distributed in the vicinity of the plasmon antenna 36 in Z-axis direction in such a way that the intensity is highest at the position of the stopper multilayer 356, that is, in the lower side of the plasmon antenna 36. Resultantly, in the plasmon antenna 36, near-field light is generated near the bottom edge 36d more than near the desired position of the vertex 36a. While, in the case that the refractive index $n_{MULTI}$ is smaller than the refractive index $n_0$ ($n_{MULTI} < n_0$), as shown in FIG. 6b, the incident laser light 48 is distributed in the vicinity of the plasmon antenna 36 in Z-axis direction in such a way that the intensity is strongest at the positions sandwiching the stopper multilayer 356, so that the laser light 48 is dispersed. Accordingly, the loss of the laser light 48 to generate near-field light in the plasmon antenna 36 becomes large, thereby reducing the light use efficiency.

Whereas, in the case that the refractive index $n_{MULTI}$ is substantially equal to the refractive index $n_0$ ($n_{MULTI} \approx n_0$), as shown in FIG. 6c, the incident laser light 48 is distributed in the vicinity of the plasmon antenna 36 in Z-axis direction in such a way that the intensity is strongest at the position of the light-receiving end surface 364 of the plasmon antenna 36. Accordingly, the plasmon antenna 36 can effectively be irradiated with the laser light 48, so that near-field light with the strongest intensity can be generated near the desired position of the vertex 36a. This allows achieving the desirable thermally-assisted magnetic recording. Here, it is known from a result of simulation experiment that the distribution in Z-axis direction of the incident laser light 48 shown in FIG. 6c can be attained by properly selecting respective layer thicknesses in the stopper multilayer 356 that has a combination of refractive indexes satisfying above-described equation (1) or (2). And it is understood that, since the stopper multilayer 356 has a three-layer structure and thus can have more parameters for adjusting the value of the overall refractive index $n_{MULTI}$ of the stopper multilayer 356, the configuration in which the refractive index $n_{MULTI}$ is substantially equal to the refractive index $n_0$ can be achieved.

FIGS. 7a to 7h show schematic diagrams illustrating the first half processes in one embodiment of the method for forming the near-field light generating element 50 according to the present invention. These figures are cross-sectional views taken by a surface parallel with the head part end surface 2210 to be formed.

Figure 7A:
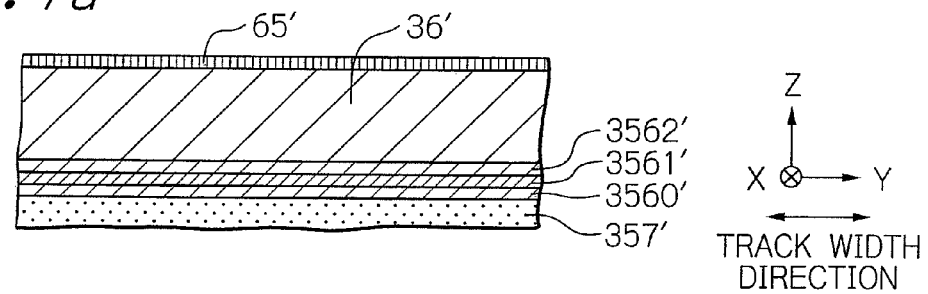
FIGS. 7a to 7h show schematic diagrams illustrating the first half processes in one embodiment of the method for forming the near-field light generating element according to the present invention.

First, as shown in FIG. 7a, on/above the element-formation surface 2202 (FIG. 4), there are sequentially formed a lower waveguide layer 357', a first etching stopper layer 3560', an additional etching stopper layer 3561', and a second etching stopper layer 3562' by using, for example, a sputtering method. Next, a plasmon antenna material layer 36', made of material for forming the plasmon antenna 36, is formed on the second etching stopper layer 3562' by using, for example, a sputtering method. Further, on the plasmon antenna-material layer 36', there is formed a side-surface forming mask layer 65' by using, for example, a sputtering method, which is to become a side-surface forming mask 65 that is a hard mask for an etching process to be applied later. The side-surface forming mask layer 65' may be formed of Ta with a thickness of, for example, approximately 10 to 15 nm.

Figure 7B:
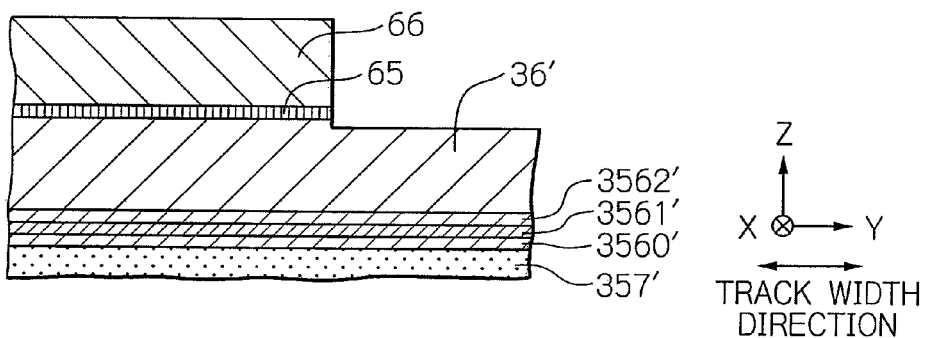

Thereafter, as shown in FIG. 7b, a predetermined photo-resist pattern 66 is formed on the side-surface forming mask layer 65' by using, for example, photo-lithography technique, and then predetermined portions of the side-surface forming mask layer 65' are etched by using, for example, an ion milling method, to form the side-surface forming mask 65.

Figure 7C:
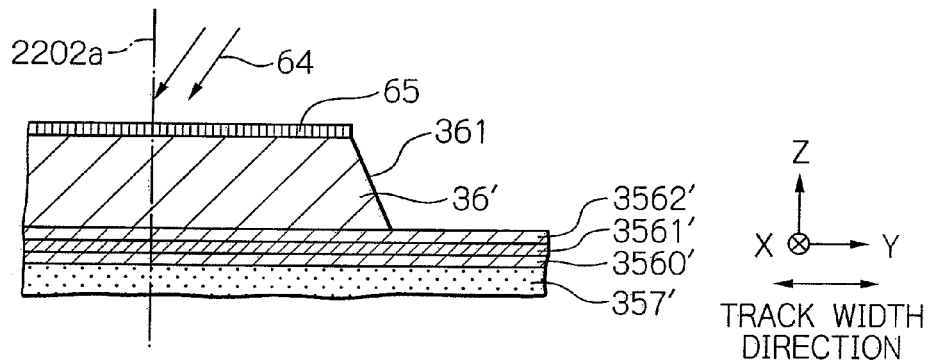

Subsequently, as shown in FIG. 7c, after removing the photo-resist pattern 66, the first side surface 361 of the plasmon antenna 36 is formed by performing an etching with use of the side-surface forming mask 65 as a mask, and of the second etching stopper layer 3562' as a stopper. Here, the side-surface forming mask 65 can be formed of Ta, the plasmon antenna material layer 36' can be formed of Au, and the second etching stopper layer 3562' can be formed of TaO$_X$ (tantalum oxide), and then, an ion milling or ion beam etching with use of mixed gas of N$_2$ and Ar, N$_2$ gas, or gas including N$_2$ can be applied as an etching process. By using the N$_2$ gas for the dry etching as described above, Ta is nitrided to become TaN (tantalum nitride), and the TaN shows a very small etching rate compared with Au of the plasmon antenna material layer 36'. Actually, when etched with the mixed gas of N$_2$ and Ar, the selective ratio of Au to TaO$_X$ reaches about 20:1. As a result, it is possible that the side-surface forming mask 65 formed of Ta functions as a mask and the second etching stopper layer 3562' formed of TaO$_X$ functions as a stopper sufficiently. This method can prevent over-etching even when enough etching time is taken for forming the first side surface 361, to thereby easily manage the etching endpoint. Further, in this dry etching, it is preferable that the normal line 2202a to the element-formation surface 2202 (FIG. 4) is inclined to an ion beam 64 at a predetermined angle, for example, 10 to 20 degrees. Furthermore, in addition to this inclination, the slider substrate 220 may be preferably rotated about the normal line 2202a serving as an axis. This allows the first side surface 361 to be formed with proper inclination to the element-formation surface 2202, and its inclination angle can be controlled.

Figure 7D:
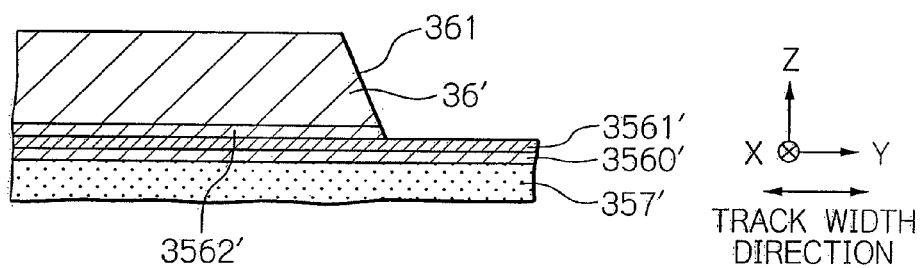

Next, as shown in FIG. 7d, the side-surface forming mask 65 used as a mask and portions of the second etching stopper layer 3562' used as a stopper are removed by etching, the removed portions of the layer 3562' being except the portion positioned directly below the plasmon antenna material layer 36'. During this etching, the additional etching stopper layer 3561' is used as an etching stopper. Here, in the case that the side-surface forming mask 65 is formed of Ta, and the second etching stopper layer 3562' is formed of TaO$_X$ (tantalum oxide) as described above, and further the additional etching stopper layer 3561' is formed of Al$_2$O$_3$ (alumina), a reactive ion etching (RIE) method with use of carbon tetrafluoride (CF$_4$) gas can be applied as the etching. In such a RIE, Au is hardly etched, and thus the formed first side surface 361 can be maintained as is. Moreover, the selective ratio of Ta to Al$_2$O$_3$ becomes about 5:1, that is, a high selective ratio can be obtained. Resultantly, the additional etching stopper layer 3561' formed of Al$_2$O$_3$ (alumina) can sufficiently function as a stopper. This process can prevent over-etching even when enough time is taken for the RIE, to thereby easily manage the etching endpoint. Although the side-surface forming mask 65 and the second etching stopper layer 3562' can be removed by etching without using the additional etching stopper layer 3561', it is very preferable from the above-described reason to provide the additional etching stopper layer 3561'.

Figure 7E:
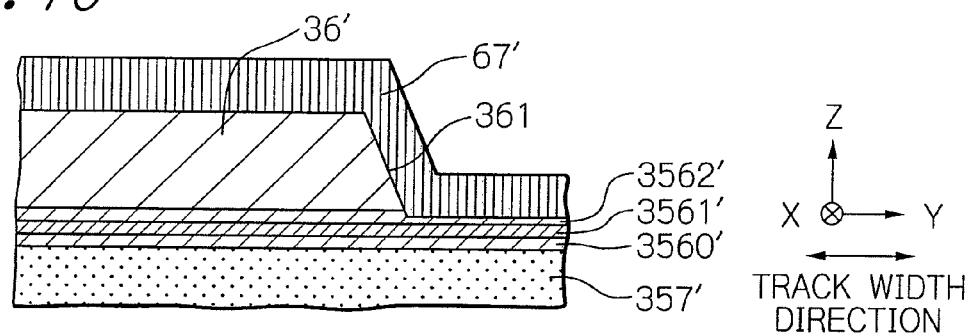

Subsequently, as shown in FIG. 7e, a side-surface protecting mask layer 67', which is to become a side-surface protecting mask 67 made of Ta with a thickness of, for example, approximately 10 to 50 nm, is formed so as to cover the first side surface 361 by using, for example, a sputtering method. During the sputtering process, the element-formation surface 2202 of the slider substrate 220 (FIG. 4) is preferably inclined to a sputtering target surface at a predetermined angle, for example, about 60 degrees.

Figure 7F:
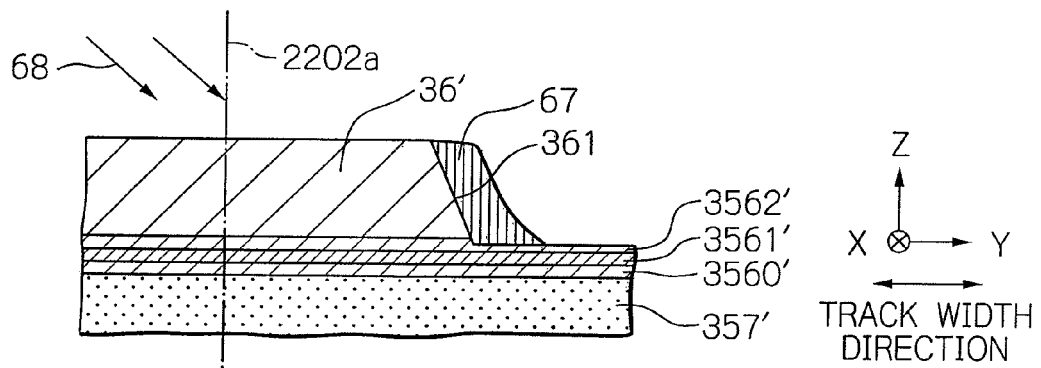

Next, as shown in FIG. 7f, portions of the side-surface protecting mask layer 67', except the portion covering the first side surface 361, are removed by etching to form the side-surface protecting mask 67 covering the first side surface 361. During this etching, the additional etching stopper layer 3561' is used as an etching stopper. Here, as described above, when the side-surface protecting mask layer 67' is formed of Ta, and the additional etching stopper layer 3561' is formed of Al$_2$O$_3$ (alumina), an ion milling with use of Ar gas can be used as the etching. In this ion milling, the selective ratio of Ta to Al$_2$O$_3$ becomes about 2:1, comparatively high, and therefore the additional etching stopper layer 3561' can function as a stopper sufficiently. During this ion milling, it is preferable that the normal line 2202a to the element-formation surface 2202 (FIG. 4) of the slider substrate 220 is inclined to an Ar ion beam 68 at a predetermined angle, for example, 60 degrees. This inclination makes the portion of the side-surface protecting mask layer 67' covering the first side surface 361 remain easily. Furthermore, in addition to this inclination, the slider substrate 220 is preferably rotated about the normal line 2202a serving as an axis.

Figure 7G:
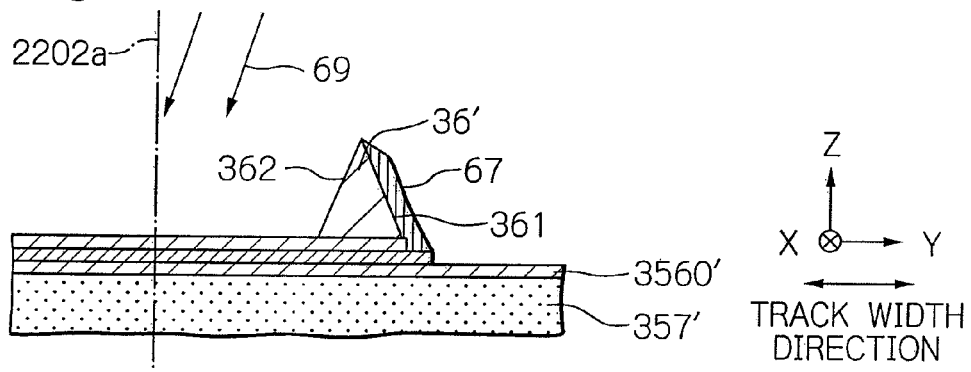

Subsequently, as shown in FIG. 7g, an etching is performed by using the side-surface protecting mask 67 covering the first side surface 361 as a mask and the first etching stopper layer 3560' and the second etching stopper layer 3562' as stoppers, to form the second side surface 362 of the plasmon antenna 36. Here, in the case that the side-surface forming mask 67 is formed of Ta, and the first etching stopper layer 3560' and the second etching stopper layer 3562' are formed of TaO$_X$ (tantalum oxide), an ion milling or ion beam etching with use of mixed gas of N$_2$ and Ar, N$_2$ gas, or gas including N$_2$ can be applied as the etching. In this case, it is possible that the side-surface forming mask 67 formed of Ta functions as a mask sufficiently, and that the first etching stopper layer 3560' and the second etching stopper layer 3562', which are formed of TaO$_X$, function as stoppers sufficiently. This method can prevent over-etching even when enough etching time is taken for forming the second side surface 362, to thereby easily manage the etching endpoint. Further, during this dry etching, it is preferable that the normal line 2202a to the element-formation surface 2202 (FIG. 4) is inclined to an ion beam 69 at a predetermined angle, for example, 10 to 20 degrees. Furthermore, in addition to this inclination, the slider substrate 220 may be preferably rotated about the normal line 2202a serving as an axis. This allows the second side surface 362 to be formed with proper inclination to the element-formation surface 2202, and its inclination angle can be controlled.

Figure 7H:
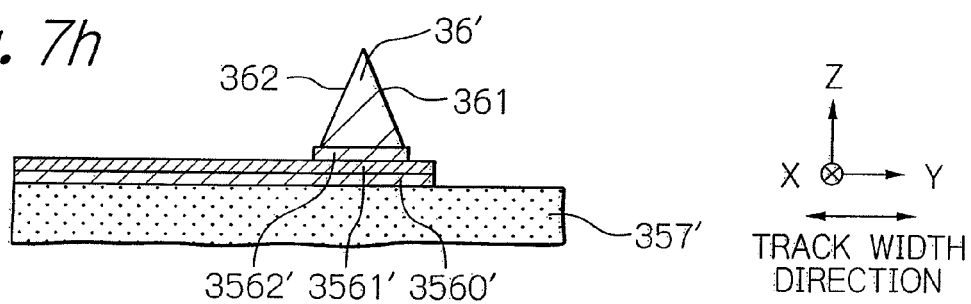

Thereafter, as shown in FIG. 7h, by performing etching, the side-surface forming mask 67 is removed, and further respective portions of the first etching stopper layer 3560' and the second etching stopper layer 3562' are removed. As a result, there are exposed the first side surface 361 and a portion of the additional etching stopper layer 3561', the portion positioned other than directly below the plasmon antenna material layer 36'. Further, a portion of the lower waveguide layer 357' may be exposed. During this etching, the additional etching stopper layer 3561' is used as an etching stopper. Here, when the first etching stopper layer 3560' and the second etching stopper layer 3562' are formed of $TaO_X$ (tantalum oxide), the side-surface forming mask 67 is formed of Ta, and the additional etching stopper layer 3561' is formed of $Al_2O_3$ (alumina) as described above, a reactive ion etching (RIE) with use of carbon tetrafluoride ($CF_4$) gas can be applied as the etching. In such a RIE, Au is hardly etched, and the formed first side surface 361 can be maintained as is. Moreover, the selective ratio of Ta to $Al_2O_3$ becomes about 5:1, that is, a high selective ratio can be obtained. Resultantly, the additional etching stopper layer 3561' formed of $Al_2O_3$ (alumina) can sufficiently function as a stopper. In this etching process, it is preferable that the first etching stopper layer 3560' remains over the lower waveguide layer 357' till the end of the etching, or is adjusted to be just removed at the time of etching end so that the lower waveguide layer 357' is not etched. Although the side-surface protecting mask 67 and respective portions of the first etching stopper layer 3560' and the second etching stopper layer 3562' can be removed by etching without using the additional etching stopper layer 3561', it is very preferable from the above-described reason to provide the additional etching stopper layer 3561'.

As described above, by using the forming method according to the present invention shown in FIGS. 7a to 7h, the first side surface 361 and the second side surface 362 of the plasmon antenna 36 can be formed properly. Here, by providing the three-layered etching stopper layers 3560', 3561' and 3562' as described above, at least one layer out of these three layers can function as an etching stopper in any one of the multiple etching processes. On the contrary, in a conventional method for forming a plasmon antenna without using such an etching stopper multilayer, multiple times of etching processes are similarly necessitated for forming the first side surface 361 and the second side surface 362 of the plasmon antenna. However, in each etching process, since a thickness of the layer for forming the plasmon antenna is very small, for example, 20 to 400 nm, it has been generally difficult to find each etching endpoint precisely, resulting in the problem of over-etching. Actually, in a configuration in which a plasmon antenna is provided on the upper surface of a waveguide layer, there may be a case that a step (depth difference), which reaches, for example, several hundred nanometers (nm), occurs between the bottom surface of the plasmon antenna and the etched surface of the waveguide layer, as a result of etching. When such a large step exists, the unevenness of the surface, particularly, the upper surface of the waveguide or the distortion within the waveguide can occur later, which leads to a problem that the propagation loss of the propagating laser light increases.

On the contrary, according to the above-described forming method of the present invention, by providing a three-layered structure of etching stopper layers 3560', 3561' and 3562', over-etching can be prevented even when enough etching time is taken in each etching process, to thereby easily manage the etching endpoint. As a result, the large step (depth difference) is not formed any more by etching. For forming the waveguide 35, the upper waveguide layer 358 (FIG. 5) is further stacked thereafter, and thus the unevenness of the surface of the waveguide 35 formed in such a way, particularly, the upper surface of the waveguide 35 can be sufficiently suppressed. There can be also sufficiently suppressed the distortion within the waveguide 35, particularly within the lower waveguide layer 357 and the upper waveguide layer 358 (FIG. 5), which can reduce the propagation loss of the propagating laser light.

The three-layered structure of etching stopper layers 3560', 3561' and 3562' becomes the etching stopper layers 3560, 3561 and 3562, respectively, after completing the formation. Accordingly, although these layers are provided within the waveguide 35, the layers do not interfere with propagation of laser light and rather have a structure of proper refractive-index combination; therefore the layers allow the plasmon antenna 36 to be effectively irradiated with the laser light.

FIGS. 8a1 to 8f show schematic diagrams illustrating the latter half processes in one embodiment of the method for forming the near-field light generating element 50 according to the present invention. Here, FIGS. 8a1, 8b1, 8c1, 8d1 and 8e1 are top views viewed from the upper side of the element-formation surface of a slider substrate, and FIGS. 8a2, 8b2, 8c2, 8d2 and 8e2 are cross-sectional views taken along lines 8a, 8b, 8c, 8d and 8e shown in FIGS. 8a1, 8b1, 8c1, 8d1 and 8e1, respectively.

As shown in FIGS. 8a1 and 8a2, there is formed the plasmon antenna material layer 36' having the first side surface 361 and the second side surface 362 over the element-formation surface 2202 (FIG. 4) of the slider substrate 220, with application of the forming method shown in FIGS. 7a to 7h. In the side of the first side surface 361 (+Y side) of the plasmon antenna material layer 36', the lower waveguide layer 357' can be exposed, and in the side of the second side surface 362 (−Y side), the additional etching stopper layer 3561' is exposed.

Then, as shown in FIGS. 8b1 and 8b2, the upper waveguide layer 358' is stacked so as to cover the first side surface 361 and the second side surface 362 of the plasmon antenna material layer 36', the lower waveguide layer 357' and the additional etching stopper layer 3561' by using, for example, a sputtering method. Thereafter, as shown in FIGS. 8c1 and 8c2, the upper surface of the stacked upper waveguide layer 358' is planarized with use of, for example, a chemical-mechanical polishing (CMP) method to form the upper surface 354 of the waveguide 35. In this case, the step (depth difference) $d_{MULTI}$ between the lower waveguide layer 357' and the additional etching stopper layer 3561' before the upper waveguide layer 358' covers them, is, for example, about 20 to 30 nm, and the step is easily eliminated or reduced by using, for example, CMP. Thus, as described above, a large step (depth difference) reaching several hundred nanometers (nm) has been a problem in conventional cases, but the forming method according to the present invention can solve this problem.

Next, as shown in FIGS. 8d1 and 8d2, a resist pattern 70 is formed on the planarized upper surface 354 of the upper waveguide layer 358', by using, for example, photolithography technique. The resist pattern 70 acts as a height-regulating mask having a predetermined width in the height direction (X-axis direction). Subsequently, as shown in FIGS. 8e1 and 8e2, an etching is performed by applying, for example, the RIE process with use of the resist pattern 70 as a mask to regulate a width of the near-field light generating element 50 in the track width direction (Y-axis direction) and one end position of the near-field light generating element 50 (plasmon antenna 36) in the height direction (X-axis direction). In this process, as described above, since the step (depth difference) $d_{MULTI}$ is eliminated or reduced, a desirable resist pattern 70 with less distortion can be formed. As a result, the width and the one end position can be regulated accurately as desired.

Figure 8F:
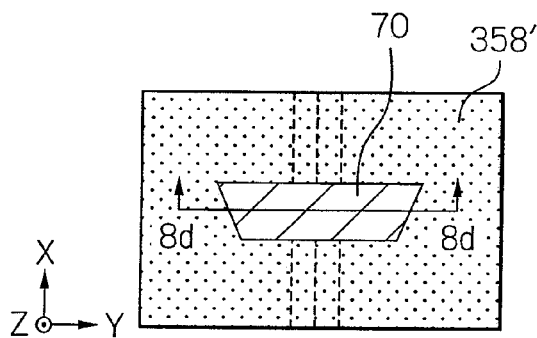
Figure 8F:
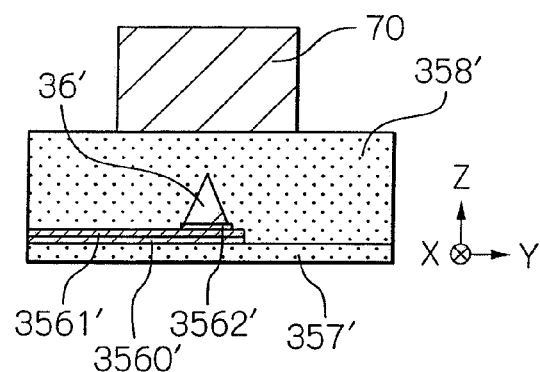
Figure 8F:
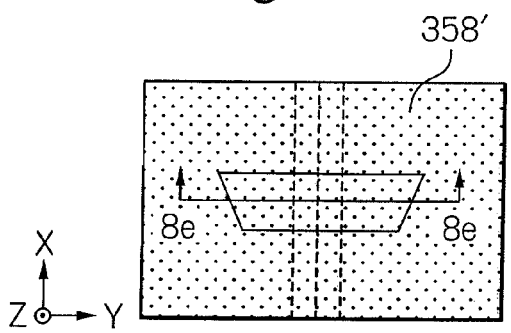
Figure 8F:
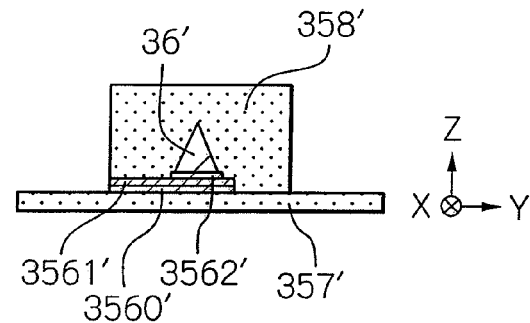
Figure 8F:
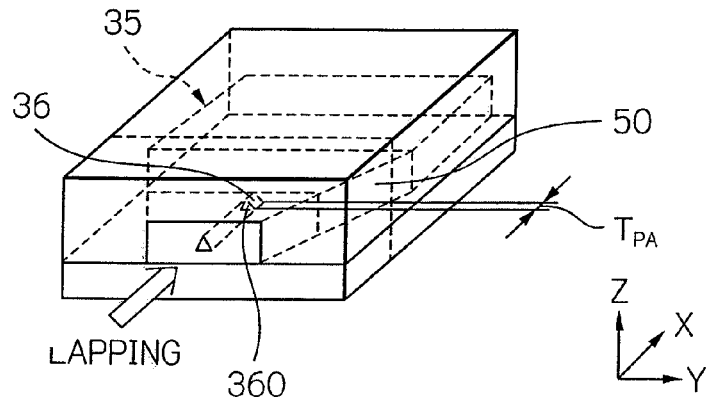

Thereafter, as shown in FIG. 8f, applied is a lapping as an MR height process, which is one of head-manufacturing processes, to thereby form the plasmon antenna 36 with a predetermined thickness $T_{P4}$. Thus, the end surface 360 of the plasmon antenna 36 becomes a polished flat surface. With the application of this lapping, the formation of the near-field light generating element 50, which includes the plasmon antenna 36 with the first side surface 361 and the second side surface 362, is completed.

As described above, according to the present invention, it is possible to sufficiently suppress the unevenness of the waveguide surface and the distortion within the waveguide, and to reduce the propagation loss of laser light. This allows achievement of desirable thermally-assisted magnetic recording, and contribution to attaining a recording density exceeding 1 Tbits/in$^2$. All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for forming a near-field light generating element including a plasmon antenna that has a first side surface and a second side surface, both surfaces being inclined to a substrate surface, and generates near-field light by being irradiated with light, the method comprising the steps of:
    forming a first etching stopper layer on a lower waveguide layer that is formed on/above the substrate surface and is made of material for forming a waveguide, and then forming a second etching stopper layer;
    forming, on said second etching stopper layer, a plasmon antenna material layer that is made of material for forming said plasmon antenna;
    etching said plasmon antenna material layer with said second etching stopper layer used as a stopper, to form said first side surface;
    forming a side-surface protecting mask so as to cover the formed first side surface; and
    etching said plasmon antenna material layer in which said first side surface is covered with said side-surface protecting mask, with the first and second etching stopper layers used as stoppers, to form said second side surface, thereby forming said plasmon-antenna.

2. The method as claimed in claim 1, wherein a side-surface forming mask is formed on said plasmon antenna material layer, and then, an etching with said side-surface forming mask used as a mask is applied, to form said first side surface.

3. The method as claimed in claim 1, wherein an additional etching stopper layer is further formed between said first etching stopper layer and said second etching stopper layer, and
    wherein, after the formation of said plasmon antenna material layer and further said first side surface, an etching is applied with said additional etching stopper layer used as a stopper, to remove portions of said second etching stopper layer, said portions positioned other than directly below said plasmon antenna material layer, and thereafter, said side-surface protecting mask is formed.

4. The method as claimed in claim 3, wherein, after the formation of said second side surface, an etching is applied to expose portions of said additional etching stopper layer, said portions positioned other than directly below said plasmon-antenna material layer.

5. The method as claimed in claim 3, further comprising:
    forming an upper waveguide layer made of material for forming said waveguide, so as to cover said plasmon antenna material layer on which said first side surface and said second side surface are formed;
    planarizing an upper surface of the formed upper waveguide layer, with use of polishing; and
    forming a height regulating mask having a predetermined width in a height direction, on the upper surface of the planarized upper waveguide layer, and forming, with use of etching, said plasmon antenna having a predetermined height and portions of said waveguide covering said plasmon antenna.

6. The method as claimed in claim 5, wherein a refractive index of said lower waveguide layer and said upper waveguide layer is set to a value between each of refractive index values of said first etching stopper layer and said second etching stopper layer, and a refractive index value of said additional etching stopper layer.

7. The method as claimed in claim 6, wherein an overall refractive index of a multilayer that comprises said first etching stopper layer, said additional etching stopper layer and said second etching stopper layer, is set to a value substantially equal to the refractive index of said lower waveguide layer and said upper waveguide layer.

8. The method as claimed in claim 6, wherein each of the refractive indices of said first etching stopper layer and said second etching stopper layer is set to be larger than the refractive index of said lower waveguide layer and said upper waveguide layer, and the refractive index of said additional etching stopper layer is set to be smaller than the refractive index of said lower waveguide layer and said upper waveguide layer.

9. The method as claimed in claim 8, wherein said first etching stopper layer and said second etching stopper layer are formed of tantalum oxide, said additional etching stopper layer is formed of alumina, the plasmon antenna material layer is formed of one element selected from a group of Au, Ag, Al, Cu, Pd, Pt, Rh and Ir, or an alloy composed of at least two elements selected from the group, and said lower waveguide layer and said upper waveguide layer are formed of silicon oxy-nitride, and
    wherein each of the etching for forming said first side surface and said second side surface is an ion milling with use of mixed gas of nitrogen and argon, nitrogen gas, or gas including nitrogen.

10. A method for manufacturing a thermally-assisted magnetic recording head comprising: a write head element for writing data onto a magnetic recording medium, formed on/above an element-formation surface of a substrate; a plasmon antenna for generating near-field light, having at least two side surfaces inclined to the element-formation surface; and a waveguide for guiding light to said plasmon antenna, the method further comprising the step of
    forming a near-field light generating element, which comprises said plasmon antenna and portions of said waveguide, the portions covering said plasmon antenna, by the method for forming the element as claimed in claim 1.

* * * * *